(12) United States Patent
Edwards et al.

(10) Patent No.: US 10,577,504 B2
(45) Date of Patent: Mar. 3, 2020

(54) TITANIUM DIOXIDE

(71) Applicant: Huntsman P&A UK Limited, Stockton-on-Tees, Durham (GB)

(72) Inventors: John L Edwards, Stockton-on-Tees (GB); Benjamin D Tucker, Stockton-on-Tees (GB); Andrew E Brown, Stockton-on-Tees (GB); Linda Gibbons, Kenilworth (GB)

(73) Assignee: HUNTSMAN P&A UK LIMITED, Stockton-on-Tees, Durham (GB)

( * ) Notice: Subject to any disclaimer, the term of this patent is extended or adjusted under 35 U.S.C. 154(b) by 0 days.

(21) Appl. No.: 15/312,270

(22) PCT Filed: May 21, 2015

(86) PCT No.: PCT/GB2015/051504
§ 371 (c)(1),
(2) Date: Nov. 18, 2016

(87) PCT Pub. No.: WO2015/177562
PCT Pub. Date: Nov. 26, 2015

(65) Prior Publication Data
US 2017/0218204 A1 Aug. 3, 2017

(30) Foreign Application Priority Data
May 23, 2014 (GB) .................. 1409208.4

(51) Int. Cl.
*C09C 1/36* (2006.01)
*C01G 23/047* (2006.01)

(52) U.S. Cl.
CPC .......... *C09C 1/3684* (2013.01); *C01G 23/047* (2013.01); *C01P 2004/61* (2013.01);
(Continued)

(58) Field of Classification Search
CPC ................................ C09B 31/053; C11D 3/42
See application file for complete search history.

(56) References Cited

U.S. PATENT DOCUMENTS 1,061,503 A   12/1977   Berger et al.
4,061,503 A * 12/1977   Berger .................. B82Y 30/00
                                                         106/445

(Continued)

FOREIGN PATENT DOCUMENTS

EP   1630209 A   3/2006
GB   2473712 A   3/2011

*Primary Examiner* — Shuangyi Abu Ali
(74) *Attorney, Agent, or Firm* — Norman B. Thot

(57) ABSTRACT

The invention provides a method for preparing a dry titanium dioxide product, comprising the steps of:
providing a dispersion comprising titanium dioxide particles;
treating the titanium dioxide particles with a silane of formula (I):

$$R^{II}(OR^{I})_{a}ORSiX_{3} \qquad (I)$$

wherein
R is a divalent C1-24 organic group that is carbon-bonded to the silicon atom,
$R^{I}$ is a C2-6 alkylene group,
$R^{II}$ is hydrogen, a C1-16 alkyl group, a C2-16 alkyl ether group, or a C2-12 acyloxy group,
X is a hydrolysable group, and
a is a number having a value from 3 to 150;
and then
drying the dispersion to provide a dry titanium dioxide product.
The dry titanium dioxide product may optionally be dispersed within a vehicle.

16 Claims, 5 Drawing Sheets

| Cum. Distribution | |
|---|---|
| % less | Size (μm) |
| 1 | 0.145 |
| 10 | 0.206 |
| 20 | 0.237 |
| 30 | 0.260 |
| 40 | 0.281 |
| 50 | 0.301 |
| 60 | 0.323 |
| 70 | 0.349 |
| 80 | 0.384 |
| 90 | 0.442 |
| 99 | 0.951 |

(52) U.S. Cl.
CPC ...... *C01P 2004/62* (2013.01); *C01P 2004/64* (2013.01); *C01P 2004/84* (2013.01)

(56) References Cited

U.S. PATENT DOCUMENTS

| | | | |
|---|---|---|---|
| 6,656,261 B2 * | 12/2003 | Tear | C09C 1/36 |
| | | | 106/436 |
| 6,972,301 B2 | 12/2005 | Hurlburt et al. | |
| 7,381,251 B2 | 6/2008 | Baker et al. | |
| 2010/0105817 A1 | 4/2010 | Arkles et al. | |
| 2011/0245392 A1 * | 10/2011 | Karpov | B82Y 30/00 |
| | | | 524/262 |
| 2012/0165186 A1 | 6/2012 | Edwards et al. | |

* cited by examiner

TITANIUM DIOXIDE

CROSS-REFERENCE TO RELATED APPLICATIONS

This application is the National Phase of International Application PCT/GB2015/051504 filed May 21, 2015 which designated the U.S. and which claims priority to Great Britain App. Serial No. 1409208.4 filed May 23, 2014. The noted applications are incorporated herein by reference.

FIELD OF THE INVENTION

The present invention relates to a method for producing a titanium dioxide pigment product. In particular, the method involves the production of a titanium dioxide pigment product, comprising pigmentary titanium dioxide particles, that is suitable for use in the production of paints or inks having good gloss properties. The method of the invention allows such a product to be produced without the need for a micronizing step and therefore the method is more energy and cost efficient.

BACKGROUND TO THE INVENTION

Titanium dioxide ($TiO_2$) is commonly viewed as being the principal white pigment in commerce. It has an exceptionally high refractive index, negligible colour and is also inert. Titanium dioxide is generally present in the market place in either of two predominant polymorphs, anatase or rutile; for the majority of commercial applications, rutile is the desired form. Titanium dioxide is well known as being useful as an opacifier in paints, paper, plastics, ceramic, inks, etc. Titanium dioxide, as sold commercially, generally has an average particle size of 150 nm to 350 nm.

There are two main processes for making raw pigmentary titanium dioxide: the sulfate process and the chloride process.

The sulfate process is based on the digestion of ilmenite or titania slag in concentrated sulfuric acid. After iron removal as iron sulfate, the solution is heated and diluted with water. The titanium hydrolyzes, forming a titanium oxysulfate precipitate, which is further treated to produce $TiO_2$ pigment.

The chloride process relies on the carbo-chlorination of low-iron, titanium containing ore or intermediate products to form $TiCl_4$, followed by the gas phase oxidation of $TiCl_4$.

Titanium dioxide can be flocculated and/or precipitated out of a titanium dioxide containing dispersion by pH adjustment of the dispersion.

The finishing process for titanium dioxide, as obtained by any known method, may include one or more of: dry milling, wet milling, classification, filtering, washing, drying, steam micronizing and packaging.

In general, in a commercial process the titanium dioxide dispersion will always be milled and micronized to achieve a desired particle size distribution.

Optionally there may be a surface treatment step. The surface treatment step generally includes precipitating alumina, silica, zirconia, and/or other metal oxides, on the surface of the titanium dioxide. The purpose of this coating treatment is to impart photo stability, shelf life, dispersability, and/or flowability. This step occurs after the wet milling step and before the drying step.

It is generally preferred in the art that the finishing process involves: milling; followed by any required surface treatment step, e.g. metal oxide coating; followed by filtering and/or washing; followed by drying; and then followed by micronizing, to obtain a final titanium dioxide white pigment product having the desired particle size distribution.

The steps of treating and drying the product can cause particles to aggregate and the micronizing step ensures that the particles in the dried and treated product are separated, so that the desired particle size distribution is restored.

Conventionally, the titanium dioxide is always micronized, in order to produce the desired particle size distribution suitable for use as a white pigment in paints, inks or the like where the mechanical energy input during the production of the paint or ink is low.

The particle size distribution in the paint or other pigment-containing product determines the hiding power achieved by the pigment-containing product.

For most paints the mean particle size (when determined using a Brookhaven BI-XDCW X-ray Disc Centrifuge System) should lie in the range of from 0.29 to 0.32 microns, with a geometric standard deviation of less than 1.45. As the skilled person will appreciate, the particle size distribution is modeled as a log normal distribution.

The particle size distribution measurement using a Brookhaven BI-XDCW X-ray Disc Centrifuge System (XDC) may be determined as follows: dried $TiO_2$ material (0.92 g) is mixed with $1/16$% sodium silicate solution (16.80 g) and de-ionised water (5.28 g) in a Bosch mill pot to give a dilute suspension of ~4% solids. The pH is adjusted to between 10 and 10.5 with two drops of sodium hydroxide solution (2%). Samples are then vigorously milled for 10 minutes using a Bosch high-speed impeller. This method is designed to be representative of the mechanical energy used in the production of most paint and inks.

It may also be desired that the particle size distribution does not have a long "tail", in other words that there is not a significant amount of large size particles present. For example, it is generally desired that 90 wt % or more of the particles should have a particle size that is less than 0.5 microns. A high concentration of particles above 0.5 microns would be detrimental to the gloss of the paint or ink. The particle size diameter can be determined using X-ray sedimentation. Ideally it is also the case that 99 wt % or more of the particles have a particle size diameter (when determined using X-ray sedimentation) that is less than 1.5 microns.

As noted above, the steps of treating and drying the product can cause particles to aggregate, meaning that the fluid energy milling (micronizing) is normally required in a conventional titanium dioxide pigment production route, in order to return the particles to the desired size. Otherwise, when the final product is subsequently dispersed (e.g. by high speed dispersion) in a vehicle, e.g. to form a paint or ink, the resultant product containing particles of titanium dioxide will not have the desired size distribution but instead will have too high a level of oversize particles.

The fluid energy milling is carried out in a fluid-energy mill (or micronizer). Most fluid-energy mills are variations on a basic configuration of a disc-shaped grinding chamber enclosed by two, generally parallel, circular plates defining axial walls, and an annular rim defining a peripheral wall, with the axial length or height of the chamber being substantially less than the diameter. Around the circumference of the mill are located a number of uniformly spaced jets for injecting the grinding fluid, which furnishes additional energy for comminution, along with one or more feed nozzles for feeding the particulate material to be comminuted. The jets are oriented such that the grinding fluid and particulate material are injected tangentially to the circumference of a circle smaller than the chamber circumference. Feed to the grinding chamber can be introduced either through a side inlet that is tangent to the grinding chamber, or at an angle from the top, usually at a 30° angle to the plane of the grinding chamber. Side feed micronizers generally produce the better grinding dispersion, while top feed micronizers can produce higher rates.

Within the grinding chamber, a vortex is formed by the introduction of the grinding fluid such as compressed gas, through the feed inlet or through fluid nozzles positioned in an annular configuration around the periphery of the grinding chamber. The grinding fluid (compressed gas, e.g., air, steam, nitrogen, etc.), fed tangentially into the periphery of the chamber, forms a high-speed vortex as it travels within the grinding chamber. The high-speed vortex sweeps up the particulate material, which results in high speed particle-to-particle collisions as well as collisions with the interior portion of the grinding chamber walls. In the micronizing of titanium dioxide, the grinding fluid is usually superheated steam.

Clearly, heavier particles have longer residence time within the vortex. Lighter particles move with the vortex of gas until the discharge conduit is reached. Typically, fluid-energy mills are capable of producing fine (less than 10 microns diameter) and ultra fine (less than 5 microns diameter) particles. However, during grinding, undesirably large particle sizes can sometimes still be found to escape into the product.

In general, in the white pigment industry, there is a particular need to reduce the amount of oversized material passing prematurely into the resulting pigment product. Thus, the intensity of grinding during micronization is typically increased as compared to when other products are micronized. This has a consequence of higher costs, in terms of fluid use, energy consumption, and reduced capacity per mill.

Further, with such processes, the amount of oversized material may be reduced, but there may be adverse effects on pigment properties.

It is a particular concern that the conventional pigment finishing process is a highly energy intensive process. The highest energy consuming operations in finishing is generally the fluid energy milling of the dried product using superheated steam.

However, this micronizing step cannot simply be omitted. Titanium dioxide pigment produced conventionally but without the use of the fluid energy micronizing step would produce a product that was unsuitable for the production of paints or inks. In particular, the product would not meet the requirements of such products in terms of gloss properties. This is due to the fact that the particle size distribution would be too broad, including a long "tail" of oversize particles.

In U.S. Pat. No. 4,061,503 the treatment of particulate titanium dioxide with a polyether substituted silicon compound is described as a method of enhancing its dispersibility in pigmented and/or filled paints and plastics, and in reinforced plastic composite compositions. The dispersion promoter compound possesses two to three hydrolyzable groups bonded to the silicon and an organic group which contains a polyalkylene oxide group. This compound may be added directly to the plastic, resin or other vehicle containing the titanium dioxide.

U.S. Pat. No. 6,972,301 B2 relates to a process for producing organically modified metal oxides and products thereof. An aqueous dispersion of a metal oxide, which can be peptized in the presence of an acid, is admixed with an aqueous dispersion of an organo silane having the formula $R_y SiX_{4-y}$, wherein R is an organic moiety, X is a moiety which produces an acid anion in the presence of water and y is from 1 to 3. The mixture of the aqueous dispersion and the organo silane is then thermally aged to produce a colloidal metal oxide sol.

U.S. Pat. No. 7,381,251 B2 describes mineral particle dispersions stabilized with a poly (oxyalkene) phosphonate. In this regard, a liquid composition is provided that comprises a mixture of: (1) water and/or a polar solvent; (2) a colloidal dispersion of mineral particles; and (3) a phosphonate terminated poly(oxyalkene) polymer.

SUMMARY OF THE INVENTION

The present invention provides, in one aspect, a method for preparing a dry titanium dioxide product, comprising the steps of:
 providing a dispersion comprising titanium dioxide particles;
 treating the titanium dioxide particles with a silane of formula (I):

$$R^{II}(OR^{I})_a ORSiX_3 \quad \quad (I)$$

wherein
 R is a divalent C1-24 organic group that is carbon-bonded to the silicon atom,
 $R^I$ is a C2-6 alkylene group,
 $R^{II}$ is hydrogen, a C1-16 alkyl group, a C2-16 alkyl ether group, or a C2-12 acyloxy group,
 X is a hydrolysable group, and
 a is a number having a value from 3 to 150;
and then
 drying the dispersion to provide a dry titanium dioxide product.

The benefit of this method is that the treatment of the titanium dioxide particles with the silane, prior to the drying step, results in a product that retains an acceptable particle size distribution even after drying. The dry titanium dioxide product, as obtained after the drying step, is one that can be readily dispersed in a vehicle (e.g. by high speed dispersion) to give a pigmentary product (e.g. a paint or ink product) comprising titanium dioxide pigment with an acceptable particle size distribution, i.e. with the desired low level of oversize particles.

As noted above, for most paints an acceptable particle size distribution is that the mean particle size (when determined using a Brookhaven BI-XDCW X-ray Disc Centrifuge System) should be from 0.29 to 0.32 microns, with a geometric standard deviation of less than 1.45. Preferably it is also the case that 90 wt % or more of the particles have a particle size diameter (when determined using X-ray sedimentation) that is less than 0.5 microns. Preferably it is also the case that 99 wt % or more of the particles have a particle size diameter (when determined using X-ray sedimentation) that is less than 1.5 microns.

Using the present invention it is possible to obtain a dry titanium dioxide product, without micronizing, that meets one or more of these criteria, e.g. two or more or these criteria, or all of these criteria.

The method of the invention contrasts with a conventional method where there is no treatment of the titanium dioxide particles with silane. In such a prior method the finishing process adversely impact the particle size distribution and therefore a micronizing step is required after drying in order to achieve an acceptable particle size distribution.

Therefore in the present invention there is no requirement for the dry titanium dioxide product to be micronized.

Instead, the particle size distribution remains acceptable even after the finishing process and therefore this energy intensive step can be omitted.

Therefore in one embodiment, the method of the first aspect does not include a step of micronizing the dry titanium dioxide product.

None of the prior methods have used a silane of formula (I) to modify the surface of (uncoated or coated) titanium dioxide particles as part of the finishing process, and before the titanium dioxide particles are dried. There was also no teaching that such a treatment would result in a product that is readily dispersed to give a product comprising titanium dioxide pigment with an acceptable particle size distribution, meaning there is no requirement for the dry titanium dioxide product to be micronized.

The method of the first aspect may optionally include a step of coating the titanium dioxide particles before the titanium dioxide particles are treated with the silane of formula (I). This step should be carried out if a coating for the titanium dioxide is required or desirable in view of the intended end use for the product.

The method of the first aspect may optionally include a step of concentrating the dispersion of titanium dioxide particles before the particles are dried. This concentration step will reduce the energy required to subsequently dry the dispersion. The concentration step may be carried out before or after the titanium dioxide particles are treated with the silane of formula (I).

In one embodiment, the dry titanium dioxide product as obtained in the drying step is then dispersed, e.g. by high speed dispersion, to provide a pigmentary product comprising dispersed titanium dioxide pigment. In one such embodiment, the dry titanium dioxide product is dispersed in a vehicle to provide a pigmentary product, such as a paint or ink product, comprising pigmentary titanium dioxide particles dispersed in said vehicle. Preferably, this dispersing step is carried out on the dry titanium dioxide product without any micronizing step having been previously carried out on the dry titanium dioxide product.

The invention also provides, in a second aspect, the use of a silane of formula (I), as defined in the first aspect, to obtain a dry titanium dioxide product that is readily dispersed.

In particular, the use of the silane is provided to obtain a dry titanium dioxide product that is readily dispersed in a vehicle to obtain a pigmentary product, such as a paint or ink product, comprising titanium dioxide particles.

The invention also provides, in a third aspect, the use of a silane of formula (I), as defined in the first aspect, to obtain a dry titanium dioxide product that is readily dispersed in a vehicle without the titanium dioxide pigment particles having been micronized.

In particular, the use of the silane is provided to obtain a dry titanium dioxide product that is readily dispersed in a vehicle to obtain a pigmentary product, such as a paint or ink product, without the titanium dioxide pigment particles having been micronized.

In all aspects of the invention, preferably the pigmentary product as obtained by dispersing the dry titanium dioxide product of the invention contains titanium dioxide particles meeting one or more of the following size criteria:

a) the mean particle size (when determined using a Brookhaven BI-XDCW X-ray Disc Centrifuge System) is from 0.29 to 0.32 microns, with a geometric standard deviation of less than 1.45.

b) 90 wt % or more of the particles have a particle size (diameter) that is less than 0.5 microns.

c) 99 wt % or more of the particles have a particle size (diameter) that is less than 1.5 microns.

Preferably this pigmentary product contains titanium dioxide particles meeting two or more of those size criteria; most preferably this pigmentary product contains titanium dioxide particles meeting all of those size criteria.

DESCRIPTION OF THE DRAWINGS

FIG. 5 is a graph showing the particle size particle size distribution, as measured using an X-ray Disk Centrifuge, for the concentrated dispersion of titania after drying, in a comparative process not in accordance with the invention, as described in Comparative Example 1a;

FIG. 6 is an optical micrograph of the concentrated dispersion of titania after drying, in a comparative process not in accordance with the invention, as described in Comparative Example 1a.

DETAILED DESCRIPTION OF THE INVENTION

Figure 1:
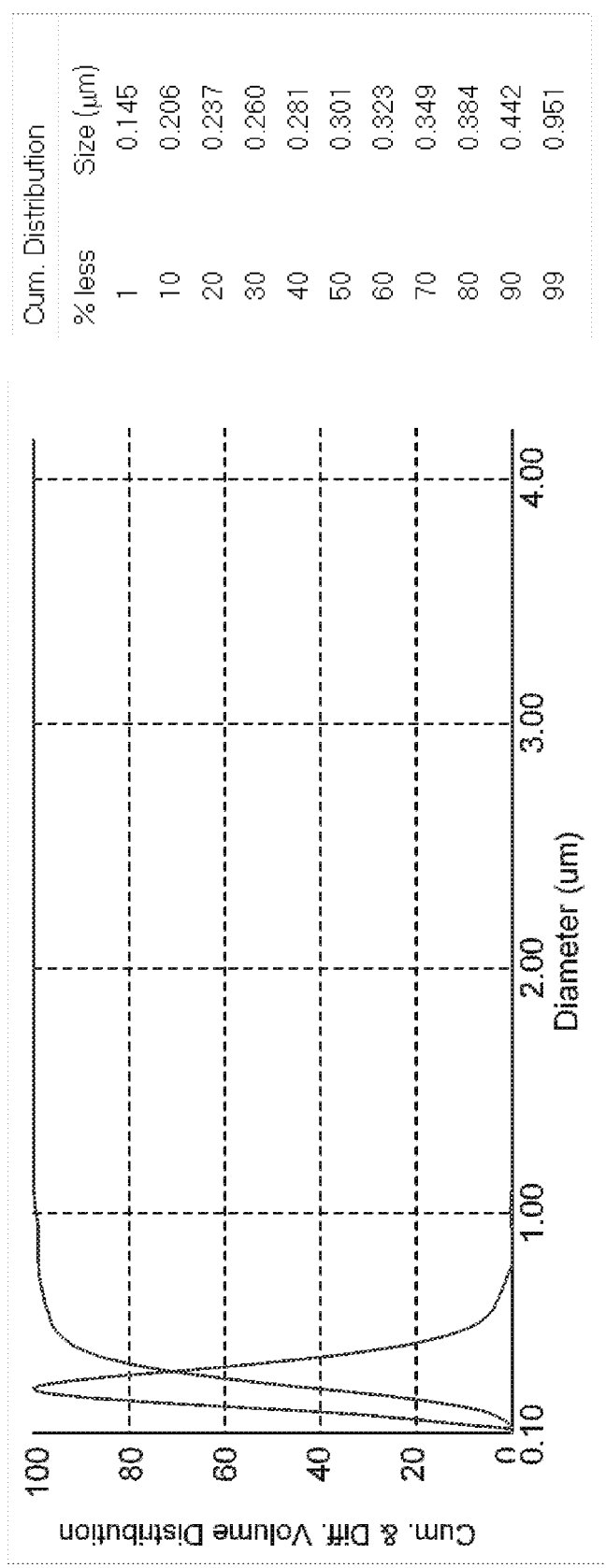
FIG. 1 is a graph showing the particle size distribution, as measured using an X-ray Disk Centrifuge, for the concentrated dispersion of titania used in Example 1 and Comparative Example 1a, before treatment commenced.

The present invention utilizes a silane of formula (I):

$$R^{II}(OR^{I})_{a}ORSiX_{3} \qquad (I).$$

R is a divalent C1-24 organic group that is carbon-bonded to the silicon atom. R may be straight chain or branched. R may be a wide range of groups because, as the skilled reader will appreciate, R is a linking group. R therefore simply serves the purpose of linking together two active parts of the silane compound, but does not itself get involved in the activity. Therefore the nature of this group is relatively wide ranging.

In one embodiment, R is a divalent C1-22 organic group, such as a divalent C1-20 organic group or a divalent C1-18 organic group or a divalent C1-12 organic group.

The R group may be branched or unbranched, e.g. it may be a branched or unbranched C1-24 alkylene, C2-24 alkenylene, or C1-24 alkoxyene group.

In one embodiment, R is a branched or unbranched divalent linking group selected from a C1-20 alkylene, a C2-20 alkenylene, and a C1-20 alkoxyene group; for example it may be a C1-18 alkylene, a C2-18 alkenylene, or a C1-18 alkoxyene group, such as a C1-12 alkylene, a C2-12 alkenylene, or a C1-12 alkoxyene group.

In one such embodiment, R is a branched or unbranched divalent linking group selected from a C2-10 alkylene, C2-10 alkenylene, or C2-10 alkoxyene group; preferably a C2-8 alkylene, C2-8 alkenylene, or C2-8 alkoxyene group;

more preferably a C2, C3, C4, C5 or C6 alkylene or alkoxyene group; most preferably a C2, C3, or C4 alkylene or alkoxyene group.

$R^I$ is a C2-6 alkylene group, preferably a C2-5 alkylene group, more preferably a C2-4 alkylene group, i.e. a C2, C3 or C4 alkylene group. Preferably it is a 1,2-alkylene group. The alkylene group may be branched or unbranched.

In one embodiment $R^I$ is a C2-4 1,2-alkylene group, which may be branched or unbranched. In one such embodiment $R^I$ is a C2, C3 or C4 1,2-alkylene group that is unbranched. In another such embodiment $R^I$ is a C3 or C4 1,2-alkylene group that is branched.

$R^{II}$ is hydrogen, a C1-16 alkyl group, a C2-16 alkyl ether group or a C2-12 acyloxy group. When $R^{II}$ is not hydrogen, its hydrocarbon chain may be branched (provided of course there are three or more carbon atoms in that chain) or unbranched. The alkyl ether group may be of formula $(CH_3)(CH_2)_o(OCH_2)_m$—, where m is an integer of from 1 to 10 and o is an integer of from 0 to 5.

In one embodiment, $R^{II}$ is hydrogen, a C1-12 alkyl group, a C2-14 alkyl ether group, or a C2-10 acyloxy group; such as hydrogen, a C1-10 alkyl group, a C2-12 alkyl ether group or a C2-8 acyloxy group. The alkyl ether group may be of formula $(CH_3)(CH_2)_o(OCH_2)_m$—, where m is an integer of from 1 to 10, e.g. from 1 to 8, and o is an integer of from 0 to 3, such as 0 or 1 or 2.

Preferably, $R^{II}$ is hydrogen, a C1-8 alkyl group, a C2-11 alkyl ether group, or a C2-6 acyloxy group, such as hydrogen, a C1-6 alkyl group, a C2-10 alkyl ether group, or a C2-5 acyloxy, e.g. it may be hydrogen, a C1-4 alkyl group, a C2-8 alkyl ether group or a C2-4 acyloxy group. The alkyl ether group may be of formula $(CH_3)(CH_2)_o(OCH_2)_m$— where m is an integer of from 1 to 10, e.g. from 1 to 8, and o is an integer of from 0 to 2, such as 0 or 1.

In one embodiment $R^{II}$ is selected from hydrogen; a C1-12 alkyl group; a C2-12 alkyl ether group of formula $(CH_3)(CH_2)_o(OCH_2)_m$— where m is an integer of from 1 to 10, e.g. from 1 to 8, and o is an integer of from 0 to 3, such as 0 or 1; and a C2-8 acyloxy group.

In another embodiment $R^{II}$ is selected from hydrogen; a C1-8 alkyl group; a C2-11 alkyl ether group of formula $(CH_3)(CH_2)_o(OCH_2)_m$— where m is an integer of from 1 to 10, e.g. from 1 to 8, and o is an integer of from 0 to 2, such as 0 or 1; and a C2-8 acyloxy group.

In yet another embodiment $R^{II}$ is selected from: a C1-4 alkyl group (which may be either branched or unbranched when the alkyl group is C3 or C4); and an alkyl ether group of formula $(CH_3)(OCH_2)_m$—, where m is an integer of from 1 to 10, e.g. from 1 to 8 or from 1 to 6 or from 1 to 4.

X is a hydrolysable group. It may, for example, be a halogen group, e.g. F, Cl, or Br, or it may be a C1-20 organic group, e.g. a C1-20 alkoxy group, or an alkoxyalkoxy group in which the terminal alkyl contains 1 to 10 carbon atoms and the internal alkylene contains 2 to 20 carbon atoms, or a C2-8 acyloxy group, or a C6-20 aryloxy group. The hydrocarbon chains in the X group may be branched or unbranched.

X may therefore, in one embodiment, be selected from: F, Cl, Br, C1-18 alkoxy groups, alkoxyalkoxy groups in which the terminal alkyl contains 1 to 8 carbon atoms and the internal alkylene contains 2 to 12 carbon atoms, C2-6 acyloxy groups, and C6-18 aryloxy groups.

X may, in one such embodiment, be selected from: F, Cl, Br, C1-12 alkoxy groups, alkoxyalkoxy groups in which the terminal alkyl contains 1 to 6 carbon atoms and the internal alkylene contains 2 to 8 carbon atoms, C2-6 acyloxy groups, and C6-12 aryloxy groups. For example, X may be selected from: F, Cl, Br, C1-8 alkoxy groups, alkoxyalkoxy groups in which the terminal alkyl contains 1 to 4 carbon atoms and the internal alkylene contains 2 to 6 carbon atoms, C2-6 acyloxy groups, and C6-10 aryloxy groups.

In one embodiment, X is selected from Cl, Br and C1-8 branched or unbranched alkoxy groups; e.g. Cl, Br and C1-6 branched or unbranched alkoxy groups; such as Cl, Br and C1-4 branched or unbranched alkoxy groups.

It may be that X is a Cl group, C1 alkoxy group, C2 alkoxy group, C3 branched or unbranched alkoxy group or C4 branched or unbranched alkoxy group. It may be that X is $OCH_3$, $OCH_2CH_3$ or Cl.

a is a number having an average (mean) value from 3 to 150. In one embodiment, a is a number having an average value from 3 to 120, such as from 3 to 100 or from 3 to 80. In one such embodiment, a is a number having an average value from 3 to 70, such as from 3 to 60, especially from 3 to 50. It may be that a is a number having an average value from 3 to 40, such as from 3 to 30, or from 3 to 20, e.g. from 3 to 18 or from 3 to 15.

Examples of some silanes of formula (I) that may be used are:

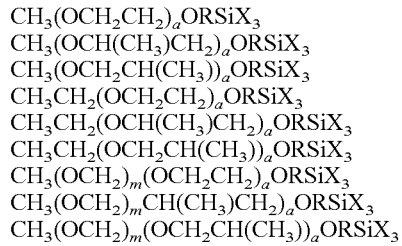

$CH_3(OCH_2CH_2)_aORSiX_3$
$CH_3(OCH(CH_3)CH_2)_aORSiX_3$
$CH_3(OCH_2CH(CH_3))_aORSiX_3$
$CH_3CH_2(OCH_2CH_2)_aORSiX_3$
$CH_3CH_2(OCH(CH_3)CH_2)_aORSiX_3$
$CH_3CH_2(OCH_2CH(CH_3))_aORSiX_3$
$CH_3(OCH_2)_m(OCH_2CH_2)_aORSiX_3$
$CH_3(OCH_2)_mCH(CH_3)CH_2)_aORSiX_3$
$CH_3(OCH_2)_m(OCH_2CH(CH_3))_aORSiX_3$ where a is a number having an average value of from 3 to 50 (e.g. from 3 to 30); m is a number from 1 to 10 (e.g. from 1 to 5); X is selected from Cl, Br and C1-4 branched or unbranched alkoxy groups; and R is a branched or unbranched divalent linking group selected from a C1-12 alkylene group, C2-12 alkenylene group, and C1-12 alkoxyene group.

The silane may be used to treat the titanium dioxide particles in the provided dispersion by adding the silane to the dispersion or by adding the dispersion to the silane. Preferably, mixing of the silane and dispersion is carried out using conventional mixing equipment as known in the art.

Mixing may be carried out for any suitable length of time, e.g. 1 minute or more, 2 minutes or more, 3 minutes or more, 4 minutes or more, or 5 minutes or more. Mixing may optionally be carried out for a time of up to 3 hours, such as up to 2 hours or up to 1 hour or up to 45 minutes or up to 30 minutes. In one embodiment the mixing is carried out for from 5 minutes to 1 hour, such as from 10 minutes to 30 minutes.

The silane may be provided so as to give an addition level of from 0.05 to 25% w/w on the titanium dioxide particles, such as from 0.05 to 15% w/w; preferably from 0.05 to 10% w/w, e.g. from 0.1 to 5% w/w, or from 0.2 to 4% w/w, or from 0.3 to 3% w/w.

In one embodiment, the titanium dioxide particles are uncoated and the silane may be provided so as to give an addition level of from 0.05 to 25% w/w on the titanium dioxide particles, such as from 0.05 to 15% w/w; preferably from 0.05 to 10% w/w, e.g. from 0.1 to 5% w/w, or from 0.2 to 4% w/w, or from 0.3 to 3% w/w.

In one embodiment, the titanium dioxide particles are coated and the silane may be provided so as to give an addition level of from 0.05 to 25% w/w on the titanium dioxide particles, such as from 0.1 to 15% w/w; preferably from 0.5 to 10% w/w, e.g. from 1 to 7% w/w, or from 1.2 to 5% w/w, or from 1.5 to 4% w/w.

In the present invention, when reference is made to the addition level of silane on the titanium dioxide particles, this is given as a w/w amount, i.e. the total weight amount of silane that is added with respect to the total weight amount of titanium dioxide particles treated. For example, it may be stated that "the addition level of the silane was 2% w/w on to the $TiO_2$".

The titanium dioxide pigment particles provided in the dispersion may be anatase, rutile or amorphous or a mixture thereof.

In one embodiment, the titanium dioxide is substantially in a rutile crystal habit. Thus, according to one embodiment, greater than 90% by weight of the titanium dioxide, preferably greater than 95% by weight of the titanium dioxide, and even more preferably greater than 99% by weight of the titanium dioxide, based on the total weight of the particulate material, is in the rutile crystal habit. The percent of titanium dioxide in the rutile crystal habit may be determined by any known method, for example, by measuring X-ray diffraction patterns. However, in some embodiments the particulate material may comprise titanium dioxide in an anatase crystal form.

As one skilled in the art is aware, crystal size is distinct from particle size. Crystal size relates to the size of the fundamental crystals which make up the particulate material. These crystals may then aggregate to some degree to form larger particles. For example, conventional titanium dioxide in a rutile crystal form has a crystal size of about 0.17 μm-0.29 μm and a particle size of about 0.25 μm-0.40 μm while conventional titanium dioxide in an anatase crystal form has a crystal size of about 0.10 μm-0.25 μm and a particle size of about 0.20 μm-0.40 μm. The particle size is thus affected by factors such as the crystal size, as well as milling techniques used during production, such as dry, wet or incorporative milling, and subsequent treatments that cause aggregation of crystals.

The particle size of the titanium dioxide may therefore be greater than or about equal to the crystal size.

The crystal size and particle size of the titanium dioxide may be determined by methods well known to those skilled in the art. For example, the crystal size may be determined by transmission electron microscopy on a rubbed out sample with image analysis of the resulting photograph. The results of the crystal size may further be validated by reference using latex NANOSPHERE™ Size Standards (available from Thermo Scientific). A method which may be used for determining the particle size of the titanium dioxide is X-ray sedimentation.

The liquid carrier in the dispersion in which the titanium dioxide particles are provided is preferably polar.

In one embodiment, the liquid carrier is aqueous; this may be water or an aqueous solution. However other polar carriers for the particles could also be contemplated, e.g. they may be selected from polar organic solvents or alcohols. The liquid carrier may also be a mixture of two or more polar carriers, e.g., it may be a mixture of water and alcohol.

The dispersion as provided may suitably have a concentration of titanium dioxide particles of from 50 g/l to 3000 g/l, such as from 100 g/l to 3000 g/l. It may be from 300 g/l to 3000 g/l, e.g. from 500 g/l to 2700 g/l, or from 600 g/l to 2500 g/l, or from 750 g/l to 2300 g/l.

In one embodiment in the starting dispersion there is from 50 g/l to 600 g/l $TiO_2$, such as from 50 g/l to 500 g/l $TiO_2$; for example it may be that there is from 100 g/l to 600 g/l $TiO_2$ or from 100 g/l to 550 g/l $TiO_2$ or from 150 g/l to 550 g/l $TiO_2$ or from 150 g/l to 500 g/l $TiO_2$. In one embodiment there is from 200 g/l to 500 g/l $TiO_2$ in the initial dispersion, e.g. from 200 g/l to 450 g/l $TiO_2$ or from 250 g/l to 450 g/l $TiO_2$ or from 250 g/l to 400 g/l $TiO_2$ or from 300 g/l to 400 g/l $TiO_2$.

The dispersion may optionally have been diluted or may have been concentrated to provide a dispersion with said concentration of titanium dioxide particles.

To produce the titanium dioxide, natural ores (such as ilmenite and mineral rutile), enriched ores (such as titanium slag and beneficiated ilmenite), or mixtures thereof may be used as the starting raw material. These ores may be processed by any suitable means, such as the sulphate process or the chloride process, to produce the titanium dioxide crystals of the required purity and size. However, it will be appreciated that the titanium dioxide as provided in dispersion form in the method of the invention can, ultimately, be obtained by any suitable technique and the invention is not limited to any method of manufacture.

As noted above, the particle size and the crystal size are not the same. As is conventional in the art, the titanium dioxide may be milled to ensure that a desired particle size distribution is obtained.

Thus the titanium dioxide in dispersion form, as provided in the method of the invention, may have been milled to ensure that a desired particle size distribution was obtained in that titanium dioxide dispersion.

In this regard, it may be that the titanium dioxide particles were dry-milled before being dispersed into dispersion form. Alternatively or additionally the titanium dioxide particles as in dispersion form may have been milled in the wet state, for example in a fine media mill. In either case, the intention is that the dispersion comprising titanium dioxide particles as provided in the method of the present invention has a particle size distribution that is desirable for the intended end use.

It may be that the dispersion comprising titanium dioxide particles as provided in the method of the present invention contains titanium dioxide particles meeting one or more of the following size criteria:

a) the mean particle size (when determined using a Brookhaven BI-XDCW X-ray Disc Centrifuge System) is from 0.29 to 0.32 microns, with a geometric standard deviation of less than 1.45.

b) 90 wt % or more of the particles have a particle size (diameter) that is less than 0.5 microns.

c) 99 wt % or more of the particles have a particle size (diameter) that is less than 1.5 microns.

Preferably the dispersion comprising titanium dioxide particles as provided in the method of the present invention contains titanium dioxide particles meeting two or more of those size criteria; most preferably it contains titanium dioxide particles meeting all of those size criteria.

As discussed above, the benefit of the present invention is that by treating the titanium dioxide particles with the silane of formula (I) the desired particle size characteristics are still retained even after the finishing process is complete without the need for a micronizing step. Thus the dry titanium dioxide product can (a) be readily dispersed in a vehicle (i.e. the mechanical energy input required is low) and (b) gives rise to a pigmentary product, such as a paint or ink product, that has suitable characteristics, e.g. good hiding power and gloss properties.

The titanium dioxide pigment particles may optionally be surface treated or coated. The treatment may be to impart any desired characteristics in view of the intended end use of the product. For example, a surface treatment may be applied to reduce the photocatalytic activity of the titanium dioxide, thus extending the lifetime of pigmentary products into which the titanium dioxide has been incorporated when the product is subjected to solar radiation. The skilled reader will know that such surface treatments for titanium dioxide particles are known in the art.

Therefore the method of the present invention may optionally include a step of coating the titanium dioxide particles before they are dried.

This step may suitably be carried out before the titanium dioxide particles are treated with the silane of formula (I).

Coating agents suitable for use include inorganic oxides and hydrous oxides. These materials are commonly used to coat an inorganic oxide or hydrous oxide onto the surface of particles. Typical inorganic oxides and hydrous oxides that may be mentioned for use as the coating agent include one or more oxides and/or hydrous oxides of silicon, aluminum, titanium, zirconium, magnesium, zinc, cerium, phosphorus, or tin.

For example, the coating agent may be $Al_2O_3$, $SiO_2$, $ZrO_2$, $CeO_2$, $P_2O_5$, sodium silicate, potassium silicate, sodium aluminate, aluminum chloride, aluminum sulphate, or mixtures thereof. Silicic acid may also be mentioned.

The coating may be dense or non dense. For example, a dense or non dense silica coating may be used and/or a dense or non dense alumina coating may be used.

In one embodiment the coating material comprises silicon dioxide applied in a dense form. In one such embodiment, the coating comprises a dense silica coating as described in U.S. Pat. No. 2,885,366.

Only one layer of coating may be applied, or more than one layer of coating may be applied (e.g. two layers or three layers). When more than one layer of coating is applied, each layer may be the same or different.

In one embodiment, only one layer of dense silica coating is added. In another embodiment, two layers of dense silica coating are added. In another embodiment, one layer of dense silica coating and one layer of dense alumina coating are added.

In one embodiment there are two or more coating materials used to coat the particles. These coatings may be applied either simultaneously in a single operation or in succession. If applied simultaneously, different coating materials may be used in combination to produce a single layer. If applied successively, different coating materials may be used separately to produce two or more layers, each layer having a different composition.

For example, in one embodiment, the particles are coated with silica, such as dense silica, to produce a layer, and also with zirconia to produce another layer.

The amount of coating that is coated onto the surface of the titanium dioxide may range from about 0.1% by weight to about 20% by weight of the coating (e.g. the inorganic oxide and/or hydrous oxide) relative to the total weight of the titanium dioxide. In one embodiment the amount of coating agent is about 0.1 to about 15% or about 0.1 to about 10% by weight, relative to the total weight of the titanium dioxide.

The particles may be, for example, coated with the coating agent at a level of up to about 7% by weight, such as from about 0.1% to about 7% by weight, or such as from about 0.5% to about 7% by weight, or such as from about 0.5% to about 6% by weight, or such as from about 1% to about 6% by weight, relative to the total weight of titanium dioxide. It may be that the particles are coated with the coating agent at a level of from about 0.1% to about 5% by weight, or such as from about 0.5% to about 5% by weight, and in particular from about 1% to about 5% by weight, relative to the total weight of titanium dioxide.

In the present invention, when reference is made to the addition level of coating on the titanium dioxide particles, this is given as a w/w amount, i.e. the total weight amount of coating material that is added with respect to the total weight amount of titanium dioxide particles treated. Thus, for example, when considering a silica coating, it may be stated that "the addition level of the $SiO_2$ was 1.5% w/w on to the $TiO_2$".

The coating material may be used to treat the titanium dioxide particles in the provided dispersion by adding the coating material to the dispersion or by adding the dispersion to the coating material. Preferably, mixing of the coating material and dispersion is carried out using conventional mixing equipment as known in the art.

Mixing may be carried out for any suitable length of time, e.g. 1 minute or more, 2 minutes or more, 3 minutes or more, 4 minutes or more, or 5 minutes or more. It may be that mixing is carried out for no more than 3 hours, e.g. no more than 2 hours, such as 1 hour or less. In one embodiment the mixing is carried out for from 5 minutes to 1 hour, such as from 10 minutes to 45 minutes, e.g. from 20 minutes to 40 minutes.

In one embodiment, a coating may be applied as follows: an aqueous dispersion comprising particles of titanium dioxide is introduced into a tank for stirring. The temperature of the dispersion is then adjusted (e.g. to about 75° C.) and its pH is adjusted (e.g. to about 10.5). A coating material is then introduced into the stirred tank in an amount sufficient to produce the desired coating. For example, to produce a 1% by weight dense silica coating, 1% silica (% wt/wt on titanium dioxide) is added to the stirred tank over a 30 minute period and is then mixed for 30 minutes; whilst to produce a 3% by weight dense silica coating, 3% silica (% wt/wt on titanium dioxide) is added in the same manner. In one embodiment, silica may be added to the stirred tank in the form of sodium silicate as coating material. To precipitate the dense silica coating onto the particles, the pH is adjusted, e.g. by adding sulphuric acid to the stirred tank. In one particular embodiment, sulphuric acid is added over a 60 minute period to bring the pH to 8.8 and then over a 35 minute period to further adjust the pH to 1.3.

The skilled reader will of course appreciate that this method can readily be modified to add different amounts of coating, as desired. The present invention does not lie in the application of the coating per se; such coatings are already known in the art and can be readily put in to practice.

In one embodiment, the coating is achieved whilst maintaining the colloidal stability of the titanium dioxide particles within the dispersion. As the skilled reader will appreciate, this can be achieved through control of factors such as electrolyte concentration in the dispersion and the pH of the dispersion.

In this regard, colloidal stability requires repulsive forces between colliding particles. However, titanium dioxide particles in water or other solvents naturally attract each other. Electrical charges on the particles result in an electrostatic repulsive force which screens this attraction. Such electrostatic repulsion is therefore desired if there is to be colloidal stability. The strength of this electrostatic repulsion depends on having a high surface charge and a low electrolyte concentration; at high electrolyte concentrations the range of the electrostatic forces is reduced and therefore the screening of attractive forces is less effective. The surface charge on titanium dioxide particles is determined by the adsorption of $H^+/OH^-$ ions; therefore the net surface charge on the particle is affected by the pH of the solution in which the particles are dispersed. At a certain pH the particle will carry no net electrical charge (and there will be no electrostatic repulsive forces); as the pH is increased upwards from this pH the particle will become increasingly negatively charged and the colloidal stability will improve. Similarly, as the pH is decreased, the particle will become increasingly positively charged and the colloidal stability will improve.

The non-flocculated coated particles can then be filtered out of the dispersion using a "cross-flow" filtration process, i.e. a process in which the dispersion passes in a direction parallel to the membrane, while the pressure gradient is across the membrane. The solids move through the system whilst remaining above the membrane and are collected as a retentate, whilst the liquid passes through the membrane and is collected as a permeate. Examples of "cross-flow" filtration processes include tangential flow filtration as well as forms of cross flow filtration where additional shear is introduced by causing vigorously vibrations in a direction tangent to the faces of the membranes.

In an alternative embodiment, the coating is achieved without maintaining the colloidal stability of the titanium dioxide particles within the dispersion. This is a conventional way that many coatings are currently applied in the industry, e.g. where an aluminium oxyhydroxide topcoat flocculates the titanium dioxide particles at a neutral pH.

The flocculated coated particles can then be filtered out of the dispersion using a "dead end" filtration process, i.e. a process in which the dispersion passes through the filter membrane solely in a direction perpendicular to the membrane, leaving all the solids on the filter membrane in the form of a filter cake. Gravity and/or other forces (e.g. a vacuum or applied pressure) may be used to force the dispersion through the membrane. Examples of "dead end" filtration processes include tube filters, pressure filters, and drum filters.

Once any required coating/surface treatment step has been completed, the coated titanium dioxide may optionally be washed.

The method of the first aspect may optionally include a step of concentrating the dispersion of titanium dioxide particles before the particles are dried. This concentration step will reduce the energy required to subsequently dry the dispersion. The concentration step may be carried out before or after the titanium dioxide particles are treated with the silane of formula (I).

The concentration step may suitably be achieved by filtering the dispersion of titanium dioxide particles, to provide a concentrated dispersion, before the particles are dried.

After the concentration step, the concentrated dispersion will have a concentration of titanium dioxide particles of 750 g/l or more, e.g. 800 g/l or more, such as 900 g/l or more, 1000 g/l or more, 1100 g/l or more, 1200 g/l or more, 1300 g/l or more, 1400 g/l or more or 1500 g/l or more.

The concentrated dispersion may suitably have a concentration of titanium dioxide particles of from 750 g/l to 3000 g/l, e.g. from 1000 g/l to 2500 g/l.

It may be that after the concentration step the concentrated dispersion has a concentration of titanium dioxide particles of from 800 g/l to 3000 g/l, e.g. from 800 g/l to 2700 g/l, or from 800 g/l to 2500 g/l, or from 800 g/l to 2000 g/l. Preferably the concentrated dispersion has a concentration of titanium dioxide particles of from 1000 g/l to 3000 g/l, e.g. from 1000 g/l to 2700 g/l, or from 1000 g/l to 2500 g/l, or from 1000 g/l to 2000 g/l. In one embodiment the concentrated dispersion has a concentration of titanium dioxide particles of from 1200 g/l to 3000 g/l, e.g. from 1200 g/l to 2700 g/l, or from 1200 g/l to 2500 g/l, or from 1200 g/l to 2000 g/l. In another embodiment the concentrated dispersion has a concentration of titanium dioxide particles of from 1400 g/l to 3000 g/l, e.g. from 1400 g/l to 2700 g/l, or from 1400 g/l to 2500 g/l, or from 1400 g/l to 2000 g/l.

In one embodiment, the concentrated dispersion has a concentration of titanium dioxide particles of from 1500 g/l to 2000 g/l.

The step of concentrating the dispersion by filtration step will require the selection of an appropriate filtration technique, dependent on whether the particles are flocculated in the dispersion or not. If the particles are flocculated, a "dead end" filtration technique is appropriate. If the particles are not flocculated, a "cross flow" filtration technique is appropriate.

In general, the particles will not be flocculated, and a "cross flow" filtration technique will be appropriate, in the event that no coating has been applied. In addition, the particles will not be flocculated, and a "cross flow" filtration technique will be appropriate, in the event that a coating has been applied whilst maintaining the colloidal stability of the titanium dioxide particles within the dispersion. As discussed above, this can be achieved through control of factors such as the amount of charged salts in the dispersion and the pH of the dispersion.

In contrast, the particles will be flocculated, and a "dead end" filtration technique will be appropriate, in the event that a coating has been applied whilst not maintaining the colloidal stability of the titanium dioxide particles within the dispersion. As discussed above, conventional coating techniques will not maintain the colloidal stability of the titanium dioxide particles within the dispersion, e.g. where an aluminium oxyhydroxide topcoat flocculates the titanium dioxide particles at a neutral pH.

The skilled reader will appreciate that it will be known whether or not the particles are flocculated based on whether or not a coating has been applied and if a coating has been applied whether the conditions have been controlled in order to maintain the colloidal stability of the titanium dioxide particles within the dispersion.

The method of the present invention involves a step of drying the dispersion, to provide the dry titanium dioxide product. The skilled reader will appreciate that this is a conventional step as carried out during finishing processes for titanium dioxide and that this step is not the essence of the invention. Essentially, this step can be carried out as normal.

This step may therefore be carried out using conventional techniques and equipment. For example, the drying may be effected by using an oven, spray drier, band drier, spin flash drier or the like.

The drying may be carried out at any suitable elevated temperature, e.g. at 50° C. or higher, such as 70° C. or higher, or 80° C. or higher, or 90° C. or higher, e.g. from 90 to 150° C. or from 100 to 120° C.

The drying may be carried out for any suitable length of time, e.g. for 30 minutes or more, such as 1 hour or more, 2 hours or more, 3 hours or more, e.g. from 1 to 10 hours or from 2 to 5 hours.

The dry titanium dioxide product may be used as titanium dioxide normally would be used. The crux of the invention is that after the drying step the titanium dioxide product is ready to use; no micronizing step is required.

In one embodiment, the dry titanium dioxide product is packaged in a container for storage. This step may be carried out directly after the drying step; no micronizing step is required.

The invention therefore provides a packaged product comprising the titanium dioxide particulate material contained within a packaging container.

The invention also provides a method for preparing a packaged product comprising titanium dioxide particulate material contained within a packaging container, the method comprising:
carrying out the method of the first aspect (including any one or more of the optional steps described above); and then
placing the dry titanium dioxide product within a packaging container.

Thus the present invention provides a method for preparing a packaged product comprising titanium dioxide particulate material contained within a packaging container, the method comprising the steps of:
providing a dispersion comprising titanium dioxide particles;
treating the titanium dioxide particles with a silane of formula (I):

 (I)

wherein
R is a divalent C1-24 organic group that is carbon-bonded to the silicon atom,
$R^I$ is a C2-6 alkylene group,
$R^{II}$ is hydrogen, a C1-16 alkyl group, a C2-16 alkyl ether group, or a C2-12 acyloxy group,
X is a hydrolysable group, and
a is a number having a value from 3 to 150;
and then
drying the dispersion to provide a dry titanium dioxide product;
and then
placing the dry titanium dioxide product within a packaging container.

In another embodiment, the dry titanium dioxide product is dispersed within a vehicle to obtain a desired pigmentary product. This step may be carried out directly after the drying step; no micronizing step is required.

The vehicle may be any component or combination of components within which the particulate material can be dispersed, and includes, but is not limited to, a resin, carrier, binder, or a mixture thereof.

In one embodiment, the vehicle is a synthetic or natural resin. The resin may be, but is not limited to, a polyolefin resin, polyvinyl chloride resin, ABS resin, polystyrene resin, methacrylic resin, polycarbonate resin, polyethylene terephthalate resin, polyamide resin, alkyd resin, acrylic resin, polyurethane resin, polyester resin, melamine resin, fluoropolymer or epoxy resin.

In another embodiment, the vehicle is a carrier. The carrier may be, but is not limited to, an aqueous solvent. For example, the carrier may be water or may consist essentially of water.

The carrier may, however, optionally comprise a non-aqueous solvent, for example, it may be or it may comprise an organic solvent, such as a petroleum distillate, alcohol, ketone, ester, glycol ether and the like.

In yet another embodiment, the vehicle is a binder. The binder may be a metal silicate binder, for example an aluminosilicate binder. The binder may also be a polymeric binder, for example, an acrylic polymer or copolymer binder.

The invention therefore provides a pigment product comprising the titanium dioxide particulate material dispersed in a vehicle.

The invention also provides a method for preparing a pigment product comprising titanium dioxide particulate material dispersed in a vehicle, the method comprising:
carrying out the method of the first aspect (including any one or more of the optional steps described above); and
dispersing the dry titanium dioxide product within a vehicle.

Thus the present invention provides a method for preparing a pigment product comprising titanium dioxide particulate material dispersed in a vehicle, the method comprising the steps of:
providing a dispersion comprising titanium dioxide particles;
treating the titanium dioxide particles with a silane of formula (I):

 (I)

wherein
R is a divalent C1-24 organic group that is carbon-bonded to the silicon atom,
$R^I$ is a C2-6 alkylene group,
$R^{II}$ is hydrogen, a C1-16 alkyl group, a C2-16 alkyl ether group, or a C2-12 acyloxy group,
X is a hydrolysable group, and
a is a number having a value from 3 to 150;
and then
drying the dispersion to provide a dry titanium dioxide product;
and then
dispersing the dry titanium dioxide product within a vehicle.

The particulate material may, for example, be present at a concentration from about 1% by volume to about 40% by volume, based on the total volume of pigment product.

In one embodiment, the vehicle is a synthetic or natural resin. The resin may be, but is not limited to, a polyolefin resin, polyvinyl chloride resin, ABS resin, polystyrene resin, methacrylic resin, polycarbonate resin, polyethylene terephthalate resin, polyamide resin, alkyd resin, acrylic resin, polyurethane resin, polyester resin, melamine resin, fluoropolymer or epoxy resin.

In another embodiment, the vehicle is a carrier. The carrier may be, but is not limited to, an aqueous solvent. For example, the carrier may be water or may consist essentially of water.

The carrier may, however, optionally comprise a non-aqueous solvent, for example, it may be or it may comprise an organic solvent, such as a petroleum distillate, alcohol, ketone, ester, glycol ether and the like.

In yet another embodiment, the vehicle is a binder. The binder may be a metal silicate binder, for example an aluminosilicate binder. The binder may also be a polymeric binder, for example, an acrylic polymer or copolymer binder.

The pigment product may optionally include one or more customary additives. Additives suitable for use include, but are not limited to, thickeners, stabilizers, emulsifiers, texturizers, adhesion promoters, UV stabilizers, de-glossing agents, dispersants, antifoaming agents, wetting agents, coalescing agents, spacer particles and biocides/fungicides.

The pigment product containing the particulate material may be used in any type of application and may be applied to any one or more surfaces of a material or substrate.

For instance, the pigment product may be, or may be used in, a paint, a varnish, an ink, a plastic, a coating, a rubber, or the like.

Furthermore, material substrates and their surfaces to which the pigment products may be applied (by any known means) are essentially unlimited; these include, but are not limited to, a building surface, an automobile, a water tower, a portable container, a road surface, a textile, an aircraft, a boat, a ship, other types of water craft, a window profile, siding, a sign, furniture, fencing, decking, and railings.

The pigment product may also be used as a stand alone composition from which an article can be formed.

The invention will now be further described, in a non limiting manner, by reference to the following examples.

Example 1

Fine media milled reactor discharge dispersion was taken from a chloride process rutile production stream. This dispersion was adjusted to a concentration of about 390 g/l of titanium dioxide in water.

This dispersion was washed by dilution on the Axium 250 L "Ultrafiltration Pilot Plant" using "Koch SUPER-COR®" tubular membranes with a membrane area of 6.6 m². This washing reduced the dispersion conductivity from 3.5 mS/cm to 1 mS/cm.

This washed dispersion was then concentrated to 1100 g/l using the "Koch ABCOR-FEG" tubular membranes.

The particle size distribution for this concentrated dispersion was measured using an X-ray Disk Centrifuge. The particles in the dispersion had a mean particle size of 0.30 microns and a geometric standard deviation (GSD) of 1.33.

A graph showing the particle size particle size distribution for the concentrated dispersion pre-treatment is shown in FIG. 1.

Figure 2:
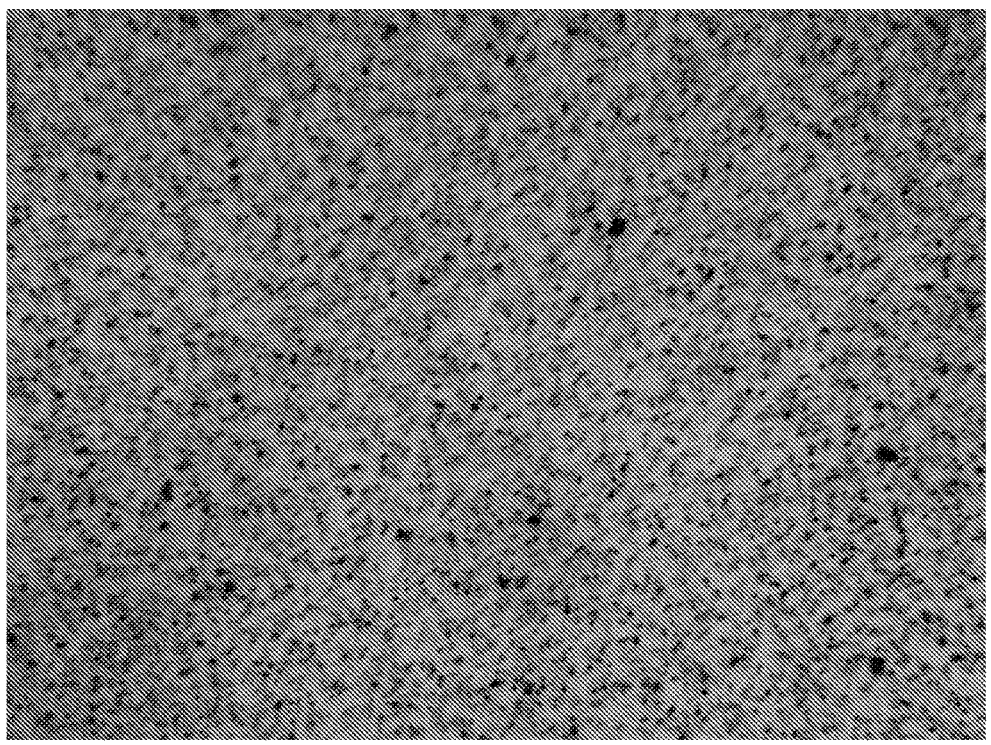
FIG. 2 is an optical micrograph of the concentrated dispersion of titania used in Example 1 and Comparative Example 1a, before treatment commenced.

An optical micrograph of the concentrated dispersion pre-treatment is shown in FIG. 2.

This concentrated dispersion (1100 g/l) was mixed for 37.5 minutes with an mPEG silane with molecular formula $CH_3(OCH_2CH_2)_{6-9}O(CH_2)_3Si(OCH_3)_3$ ("6-9 mPEG"). The addition level of the silane was 2% w/w on to the $TiO_2$. The pH of the mixture was 7.25, and the temperature was 37.5° C.

Following the mPEG silane treatment, the dispersion was dried in a Memmert oven at 105° C. for 4 hours 15 minutes.

The dried samples were then cooled in a desiccator. The dried pigment was broken up in a micro pulverisette and then mixed with water in a high speed disperser.

The particle size distribution was measured using an X-ray Disk Centrifuge method. The mean particle size was 0.30 microns, with a GSD of 1.33.

This therefore meets the desired criteria of a mean particle size (when determined using a Brookhaven BI-XDCW X-ray Disc Centrifuge System) of from 0.29 to 0.32 microns, with a geometric standard deviation of less than 1.45.

Figure 3:
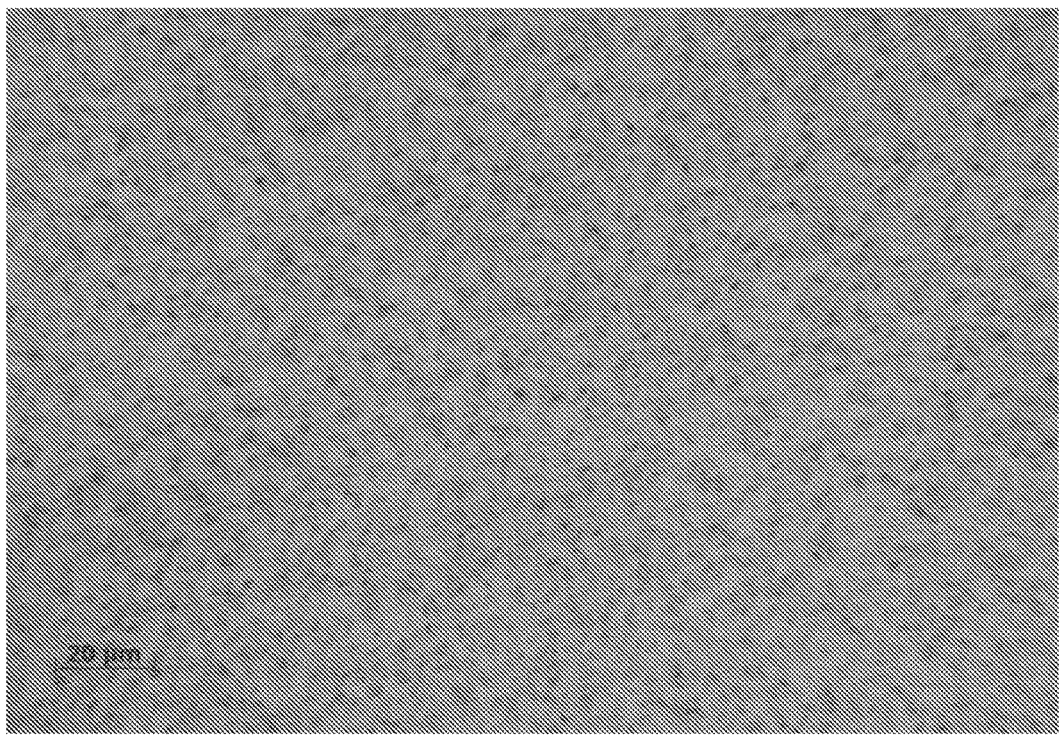
FIG. 3 is an optical micrograph of the concentrated dispersion of titania after treatment with 6-9 mPEG silane and drying, in a process according to the invention, as described in Example 1.

An optical micrograph of the concentrated dispersion post-treatment and drying is shown in FIG. 3.

Figure 4:
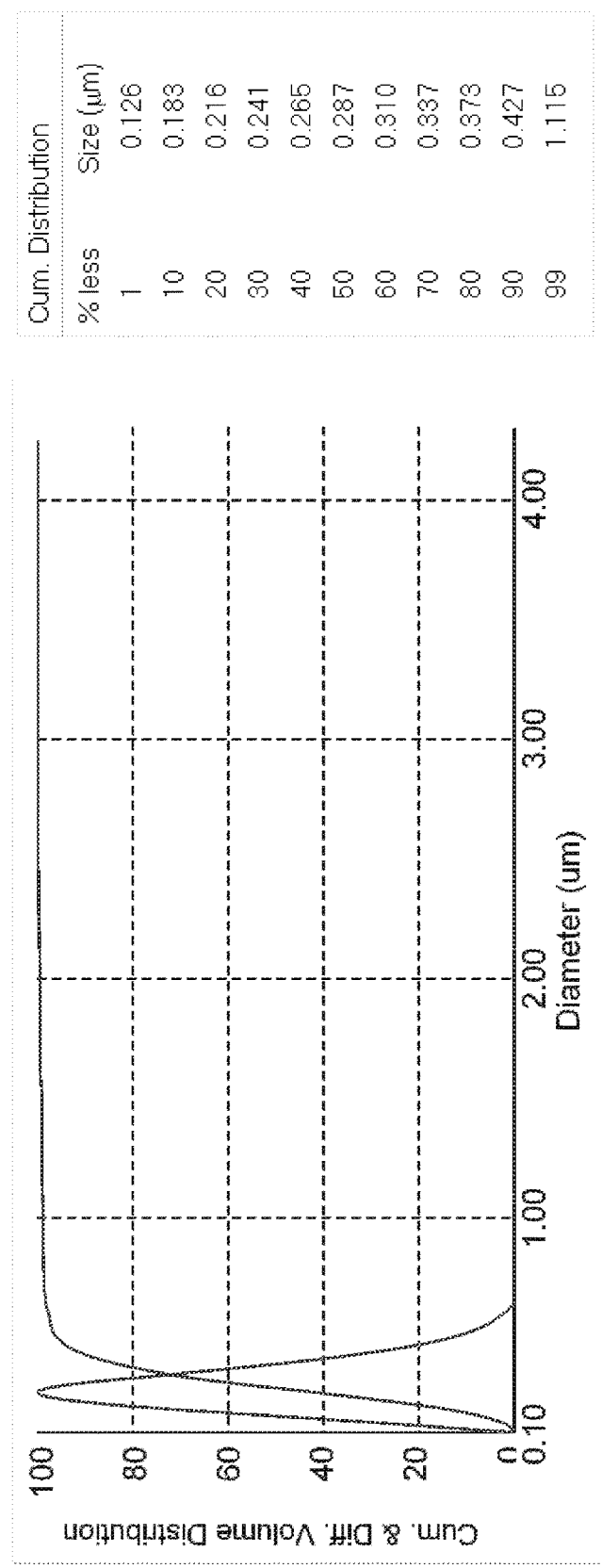
FIG. 4 is a graph showing the particle size particle size distribution, as measured using an X-ray Disk Centrifuge, for the concentrated dispersion of titania after treatment with 6-9 mPEG silane and drying, in a process according to the invention, as described in Example 1.

A graph showing the particle size particle size distribution for the concentrated dispersion post-treatment and drying is shown in FIG. 4.

It can be seen that 90 wt % or more of the particles have a particle size that is less than 0.43 microns and that 99 wt % or more of the particles have a particle size (diameter) that is less than 1.12 microns.

Therefore this meets the desired criteria that 90 wt % or more of the particles have a particle size that is less than 0.5 microns and that 99 wt % or more of the particles have a particle size that is less than 1.5 microns.

Comparative Example 1a

Fine media milled reactor discharge dispersion was taken from a chloride process rutile production stream. This dispersion was adjusted to a concentration of about 390 g/l of titanium dioxide in water.

This dispersion was washed by dilution on the Axium 250 L "Ultrafiltration Pilot Plant" using "Koch SUPER-COR®" tubular membranes with a membrane area of 6.6 m². This washing reduced the dispersion conductivity from 3.5 mS/cm to 1 mS/cm.

This washed dispersion was then concentrated to 1100 g/l using the "Koch ABCOR-FEG" tubular membranes.

The particle size distribution for this concentrated dispersion was measured using an X-ray Disk Centrifuge. The particles in the dispersion had a mean particle size of 0.30 microns and a geometric standard deviation (GSD) of 1.33.

A graph showing the particle size particle size distribution for the concentrated dispersion pre-treatment is shown in FIG. 1.

An optical micrograph of the concentrated dispersion pre-treatment is shown in FIG. 2.

No silane treatment was carried out.

This dispersion, without silane treatment, was dried in a Memmert oven at 105° C. for 4 hours 15 minutes.

The dried samples were then cooled in a desiccator. The dried pigment was broken up in a micro pulverisette and then mixed with water in a high speed disperser.

The particle size distribution measured using an X-ray Disk Centrifuge method. The mean particle size was 0.35 microns, with a GSD of 1.38.

This therefore does not meet the desired criteria of a mean particle size (when determined using a Brookhaven BI-XDCW X-ray Disc Centrifuge System) of from 0.29 to 0.32 microns.

Figure 5:
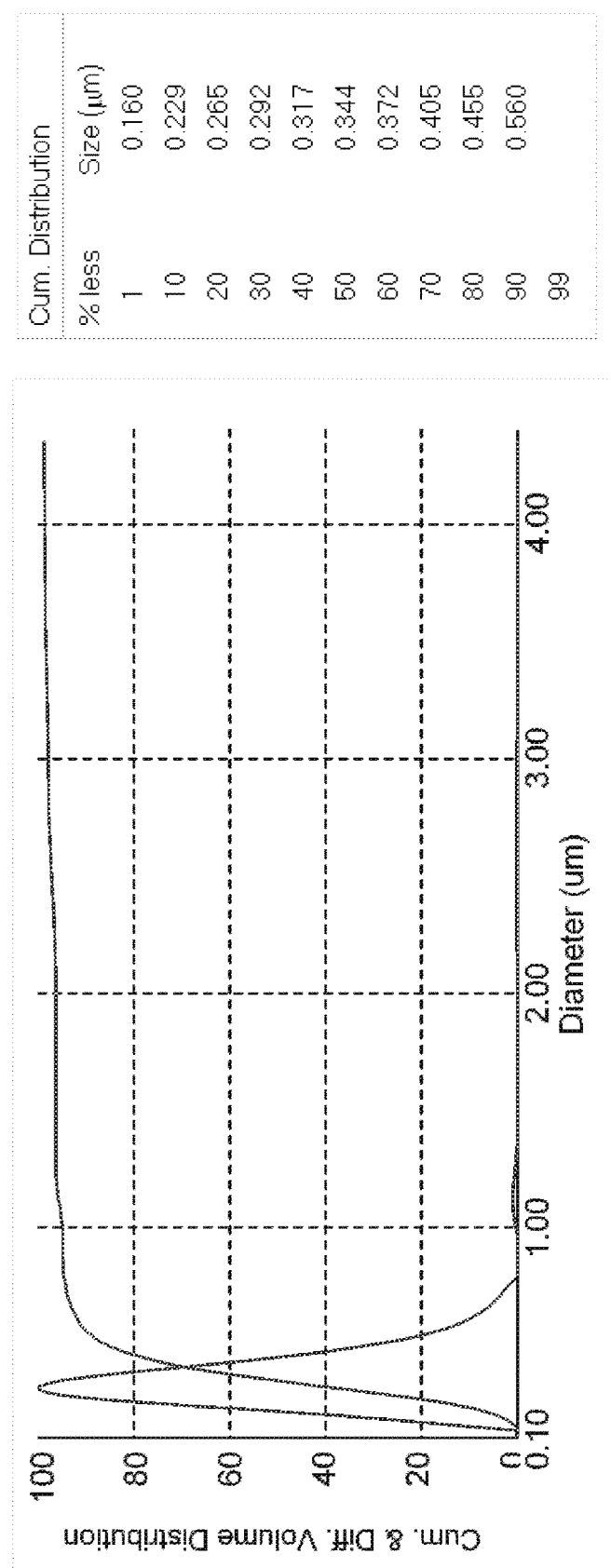

A graph showing the particle size particle size distribution for the concentrated dispersion post-drying is shown in FIG. 5.

It can be seen that 90 wt % or more of the particles have a particle size that is less than 0.56 microns.

Therefore this does not meet the desired criteria that 90 wt % or more of the particles have a particle size that is less than 0.5 microns.

Figure 6:
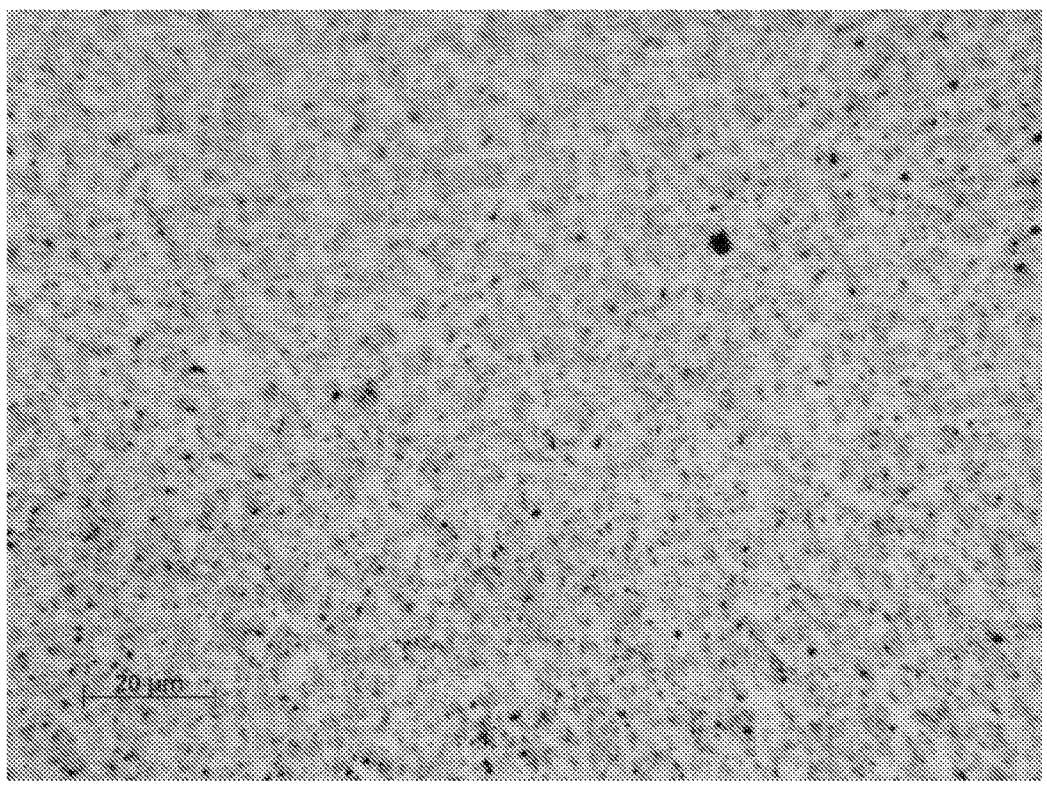

An optical micrograph of the concentrated dispersion post-drying is shown in FIG. 6.

Conclusion

It can be seen that the silane treatment according to the invention, as in Example 1, results in the dried sample having desirable particle size characteristics, which were very similar to those of the particles in the dispersion before treatment and drying. The dried particles met all three of the desired criteria (a) to (c) discussed above.

In contrast, the dried sample in Comparative Example 1a, where no silane treatment had been carried out on the dispersion before drying, had a higher mean particle size and a larger geometric standard deviation for the particle size distribution. In addition, it had a longer "tail", with a larger proportion of the particles being large in size. It did not meet all three of the desired criteria (a) to (c) discussed above.

Thus the silane treatment according to the invention results in the dried titanium dioxide particles directly having good particle size characteristics, without the need for a micronizing step. When the silane treatment was not carried out, the dried titanium dioxide particles did not have good enough particle size characteristics and therefore a micronizing step would need to be carried out on the dried product before it could be used to form a pigment product such as a paint or ink product or the like.

Example 2

Fine media milled reactor discharge dispersion was taken from a chloride process rutile production stream. This dispersion was adjusted to a concentration of about 390 g/l of titanium dioxide in water.

This dispersion was washed by dilution on the Axium 250 L "Ultrafiltration Pilot Plant" using "Koch SUPER-COR®" tubular membranes with a membrane area of 6.6 m$^2$. This washing reduced the dispersion conductivity from 3.5 mS/cm to 1 mS/cm.

The TiO$_2$ concentration within the dispersion was adjusted to 350 g/l by dilution.

The particles were then coated. In this regard, the pH of the dispersion was adjusted to 10 and its temperature was raised to 90° C. Sodium silicate was added to the dispersion over 45 minutes and allowed to mix for 30 minutes. The addition level of the SiO$_2$ was 1.5% w/w on to the TiO$_2$. The pH of the dispersion was reduced from 10 to 8 over a period of 90 minutes by the addition of sulphuric acid. The dispersion was then cooled to room temperature.

Following this coating step the dispersion was washed down to 1 mS/cm and then concentrated to 1000 g/l using the "Koch SUPER-COR®" membrane. The particle size distribution was then measured using an X-ray Disk Centrifuge. The dispersion had a particle size of 0.31 microns and a GSD of 1.39. Thus the coating procedure did not change the particle size of the titanium dioxide particles in the dispersion.

This 1.5% SiO$_2$ coated and concentrated dispersion (1000 g/l) was mixed for 37.5 minutes with an mPEG silane with molecular formula CH$_3$(OCH$_2$CH$_2$)$_{9-12}$O(CH$_2$)$_3$Si(OCH$_3$)$_3$ ("9-12 mPEG"). The addition level of the silane was 2% w/w on to the TiO$_2$. The pH of the mixture was 7.25, and the temperature was 37.5° C.

Following the mPEG silane treatment, the dispersion was dried in a Memmert oven at 105° C. for 4 hours 15 minutes.

The dried samples were then cooled in a desiccator. The dried pigment was broken up in a micro pulverisette and then mixed with water in a high speed disperser.

The particle size distribution measured using an X-ray Disk Centrifuge method. The particle size was 0.31 microns with a GSD of 1.43.

This therefore meets the desired criteria of a mean particle size (when determined using a Brookhaven BI-XDCW X-ray Disc Centrifuge System) of from 0.29 to 0.32 microns, with a geometric standard deviation of less than 1.45.

Comparative Example 2a

Fine media milled reactor discharge dispersion was taken from a chloride process rutile production stream. This dispersion was adjusted to a concentration of about 390 g/l of titanium dioxide in water.

This dispersion was washed by dilution on the Axium 250 L "Ultrafiltration Pilot Plant" using "Koch SUPER-COR©" tubular membranes with a membrane area of 6.6 m$^2$. This washing reduced the dispersion conductivity from 3.5 mS/cm to 1 mS/cm.

The TiO$_2$ concentration within the dispersion was adjusted to 350 g/l by dilution.

The particles were then coated. In this regard, the pH of the dispersion was adjusted to 10 and its temperature was raised to 90° C. Sodium silicate was added to the dispersion over 45 minutes and allowed to mix for 30 minutes. The addition level of the SiO$_2$ was 1.5% w/w on to the TiO$_2$. The pH of the dispersion was reduced from 10 to 8 over a period of 90 minutes by the addition of sulphuric acid. The dispersion was then cooled to room temperature.

Following this coating step the dispersion was washed down to 1 mS/cm and then concentrated to 1000 g/l using the "Koch SUPER-COR®" membrane. The particle size distribution was then measured using an X-ray Disk Centrifuge. The dispersion had a particle size of 0.31 microns and a GSD of 1.39. Thus the coating procedure did not change the particle size of the titanium dioxide particles in the dispersion.

No silane treatment was carried out.

This dispersion, without silane treatment, was dried in a Memmert oven at 105° C. for 4 hours 15 minutes.

The dried samples were then cooled in a desiccator. The dried pigment was broken up in a micro pulverisette and then mixed with water in a high speed disperser.

The particle size distribution measured using an X-ray Disk Centrifuge method. The particle size was 0.41 micron with a GSD of 1.87.

This therefore does not meet the desired criteria of a mean particle size (when determined using a Brookhaven BI-XDCW X-ray Disc Centrifuge System) of from 0.29 to 0.32 microns, with a geometric standard deviation of less than 1.45.

Comparative Example 2b

Fine media milled reactor discharge dispersion was taken from a chloride process rutile production stream. This dispersion was adjusted to a concentration of about 390 g/l of titanium dioxide in water.

This dispersion was washed by dilution on the Axium 250 L "Ultrafiltration Pilot Plant" using "Koch SUPER-COR®" tubular membranes with a membrane area of 6.6 m$^2$. This washing reduced the dispersion conductivity from 3.5 mS/cm to 1 mS/cm.

The TiO$_2$ concentration within the dispersion was adjusted to 350 g/l by dilution.

The particles were then coated. In this regard, the pH of the dispersion was adjusted to 10 and its temperature was raised to 90° C. Sodium silicate was added to the dispersion over 45 minutes and allowed to mix for 30 minutes. The addition level of the SiO$_2$ was 1.5% w/w on to the TiO$_2$. The pH of the dispersion was reduced from 10 to 8 over a period of 90 minutes by the addition of sulphuric acid. The dispersion was then cooled to room temperature.

Following this coating step the dispersion was washed down to 1 mS/cm and then concentrated to 1000 g/l using the "Koch SUPER-COR®" membrane. The particle size distribution was then measured using an X-ray Disk Centrifuge. The dispersion had a particle size of 0.308 microns and a GSD of 1.393. Thus the coating procedure did not change the particle size of the titanium dioxide particles in the dispersion.

No silane treatment was carried out.

The material was then spray dried and single pass micronized. The particle size distribution measured using an X-ray Disk Centrifuge method.

The single pass micronized material had a particle size of 0.34 microns with a GSD of 1.37.

This therefore does not meet the desired criteria of a mean particle size (when determined using a Brookhaven BI-XDCW X-ray Disc Centrifuge System) of from 0.29 to 0.32 microns, with a geometric standard deviation of less than 1.45, as the mean particle size is too large.

Double pass micronized material had a particle size of 0.332 with a GSD of 1.35.

Therefore although both the particle size and GSD are reduced, this still does not meet the desired criteria of a mean particle size (when determined using a Brookhaven BI-XDCW X-ray Disc Centrifuge System) of from 0.29 to 0.32 microns, with a geometric standard deviation of less than 1.45, as the mean particle size is still too large.

Conclusion

It can be seen that the silane treatment according to the invention, as in Example 2, results in the coated and dried sample having desirable particle size characteristics. The dried particles met the desired criteria (a) discussed above. Criteria (b) and (c) were not tested in this example.

In contrast, the coated and dried sample in Comparative Example 2a, where no silane treatment had been carried out on the dispersion before drying, had a higher mean particle size and a larger geometric standard deviation for the particle size distribution. It did not meet the desired criteria (a) discussed above. Criteria (b) and (c) were not tested in this example.

Further, the coated and dried sample in Comparative Example 2b, where no silane treatment had been carried out on the dispersion before drying, had a higher mean particle size than Example 2, even after micronizing. It did not meet the desired criteria (a) discussed above. Criteria (b) and (c) were not tested in this example.

Therefore although the use of micronizing after the drying step clearly reduces the mean particle size and the geometric standard deviation for the particle size distribution, it does not reduce both those values to the levels that can be achieved by the use of the silane treatment in accordance with the invention.

Thus the silane treatment according to the invention results in the coated and dried titanium dioxide particles directly having good particle size characteristics, without the need for a micronizing step. When the silane treatment was not carried out, the coated and dried titanium dioxide particles did not have good enough particle size characteristics. Even when a micronizing step was carried out on the dried product, although the particle size characteristics were significantly improved the mean particle size would still require further reduction before the product would be ideal for use in forming a pigment product, such as a paint or ink product.

Example 3

Further tests were carried out, based on Examples 1 and 2, using three different silanes:
  $CH_3(OCH_2CH_2)_3O(CH_2)_3Si(OCH_3)_3$ ("3 mPEG")
  $CH_3(OCH_2CH_2)_{6-9}O(CH_2)_3Si(OCH_3)_3$ ("6-9 mPEG")
  $CH_3(OCH_2CH_2)_{9-12}O(CH_2)_3Si(OCH_3)_3$ ("9-12 mPEG")

Different amounts of silane were also used, with addition levels of from 1.00% to 3.00% (w/w silane on the $TiO_2$) being tested.

The titanium dioxide particles were either uncoated (as in Example 1) or coated with 1.5% $SiO_2$ (as in Example 2).

The particle size distribution measured using an X-ray Disk Centrifuge method.

The particle size and GSD results are shown in Table 1.

TABLE 1

| Experiment | Coating | Silane | Theoretical silane on $TiO_2$ (w/w %) | Mean particle size (microns) | GSD |
|---|---|---|---|---|---|
| 3a | None | 3 mPEG | 1.00 | 0.27 | 1.34 |
| 3b | None | 3 mPEG | 2.00 | 0.29 | 1.33 |
| 3c | None | 3 mPEG | 3.00 | 0.30 | 1.33 |
| 3d | None | 6-9 mPEG | 1.00 | 0.30 | 1.34 |
| 3e | None | 6-9 mPEG | 2.00 | 0.30 | 1.33 |
| 3f | None | 6-9 mPEG | 2.99 | 0.31 | 1.33 |
| 3g | None | 9-12 mPEG | 1.00 | 0.30 | 1.35 |
| 3h | None | 9-12 mPEG | 2.00 | 0.31 | 1.33 |
| 3i | None | 9-12 mPEG | 3.00 | 0.30 | 1.33 |
| 3j | 1.5% $SiO_2$ | 3 mPEG | 2.00 | 0.29 | 1.39 |
| 3k | 1.5% $SiO_2$ | 6-9 mPEG | 3.00 | 0.29 | 1.38 |
| 3l | 1.5% $SiO_2$ | 9-12 mPEG | 2.00 | 0.31 | 1.43 |
| 3m | 1.5% $SiO_2$ | 9-12 mPEG | 3.00 | 0.29 | 1.39 |

The mean particle size (when determined using a Brookhaven BI-XDCW X-ray Disc Centrifuge System) ranges from 0.290 to 0.313 microns with the GSD ranging from 1.33 to 1.43.

This meets the desired mean particle size of from 0.29 to 0.32 microns and the desired geometric standard deviation of less than 1.45.

In general, for a coated product a slightly higher amount of silane treatment may be required to ensure that both a desired mean particle size and a desired geometric standard deviation are achieved.

CONCLUSION

It can be seen that good results are obtained for all silanes tested, at all treatment levels and regardless of whether the particles are coated or uncoated.

The silane treatment of the present invention therefore provides a means for achieving desired particle size characteristics, e.g. a desired mean particle size and a desired geometric standard deviation, without the need for a micronizing step after the titanium dioxide particles have been dried.

The invention claimed is:

1. A method for preparing a dry titanium dioxide product, comprising the steps of:
   providing a dispersion comprising titanium dioxide particles having a mean particle size of from 0.20 to 0.32 μm with a geometric standard deviation of less than 1.45;
   treating the titanium dioxide particles with a silane of formula (I):

$$R^{II}(OR^I)_aORSiX_3 \qquad (I)$$

wherein R is a divalent $C_1$-$C_{24}$ organic group that is carbon-bonded to the silicon atom, $R^I$ is a $C_2$-$C_6$ alkylene group, $R^{II}$ is hydrogen, a $C_1$-$C_{16}$ alkyl group, a $C_2$-$C_{16}$ alkyl ether group, or a $C_2$-$C_{12}$ acyloxy group, X is a hydrolysable group, and a is a number having a value from 3 to 150; and then
   concentrating the dispersion so that a concentration of the titanium dioxide particles in the concentrated dispersion is from 1000 g/l to 2500 g/l; and then
   drying the concentrated dispersion to provide a dry titanium dioxide product, wherein, the method does not include a flocculation step.

2. The method of claim 1, wherein the dry titanium dioxide product is readily dispersed.

3. The method of claim 2, wherein the dry titanium dioxide product is readily dispersed in a vehicle to obtain a pigmentary product comprising titanium dioxide particles.

4. The method of claim 2, wherein the dry titanium dioxide product is readily dispersed in a vehicle without the titanium dioxide pigment particles having been micronized.

5. The method of claim 3, wherein the titanium dioxide pigment particles have not been micronized.

6. The method of claim 1, wherein the titanium dioxide particles are coated before they are treated with the silane of formula (I).

7. The method of claim 1, wherein R is a branched or unbranched divalent linking group selected from: a $C_1$-$C_{20}$ alkylene; a $C_2$-$C_{20}$ alkenylene; and a $C_1$-$C_{20}$ alkoxyene group.

8. The method of claim 1, wherein $R^I$ is a $C_2$-$C_4$ 1,2-alkylene group, which may be branched or unbranched.

9. The method of claim 1, wherein $R^{II}$ is selected from hydrogen; a $C_1$-$C_{12}$ alkyl group; a $C_2$-$C_{12}$ alkyl ether group of formula $(CH_3)(CH_2)_o(OCH_2)_m$— where m is an integer of from 1 to 10, and o is an integer of from 0 to 3; and a $C_2$-$C_8$ acyloxy group.

10. The method or use of claim 9, wherein $R^{II}$ is selected from: a $C_1$-$C_4$ alkyl group; and an alkyl ether group of formula $(CH_3)(OCH_2)_m$—, where m is an integer of from 1 to 10.

11. The method of claim 1, wherein X is selected from: a halogen group; a $C_1$-$C_{20}$ alkoxy group; an alkoxyalkoxy group in which the terminal alkyl contains 1 to 10 carbon atoms and the internal alkylene contains 2 to 20 carbon atoms; a $C_2$-$C_8$ acyloxy group; and a $C_6$-$C_{20}$ aryloxy group.

12. The method of claim 11, wherein X is selected from Cl, Br and $C_1$-$C_8$ branched or unbranched alkoxy groups.

13. The method of claim 1, wherein a is a number having an average value from 3 to 100.

14. The method of claim 11, wherein a is a number having an average value from 3 to 50.

15. The method of claim 1, wherein the silane is:

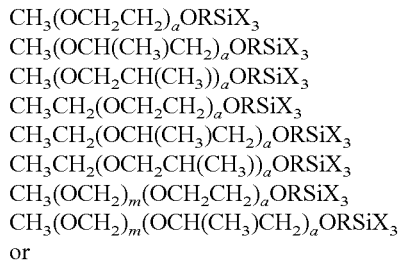

or

where a is a number having an average value of from 3 to 50; m is a number from 1 to 10; X is selected from Cl, Br and $C_1$-$C_4$ branched or unbranched alkoxy groups; and R is a branched or unbranched divalent linking group selected from a $C_1$-$C_{12}$ alkylene group, a $C_2$-$C_{12}$ alkenylene group, and a $C_1$-$C_{12}$ alkoxyene group.

16. The method of claim 1, wherein the silane is provided so as to give an addition level of from 0.05 to 25% w/w on the titanium dioxide particles.

* * * * *